(12) United States Patent
Breindl et al.

(10) Patent No.: US 11,338,368 B2
(45) Date of Patent: May 24, 2022

(54) SEALING RING

(71) Applicant: Siemens Energy Global GmbH & Co. KG, Munich (DE)

(72) Inventors: Martin Breindl, Sengenthal (DE); Armin Trübel, Norrköping (SE)

(73) Assignee: SIEMENS ENERGY GLOBAL GMBH & CO. KG, Munich (DE)

( * ) Notice: Subject to any disclaimer, the term of this patent is extended or adjusted under 35 U.S.C. 154(b) by 139 days.

(21) Appl. No.: 16/635,619

(22) PCT Filed: Sep. 13, 2018

(86) PCT No.: PCT/EP2018/074685
§ 371 (c)(1),
(2) Date: Jan. 31, 2020

(87) PCT Pub. No.: WO2019/053095
PCT Pub. Date: Mar. 21, 2019

(65) Prior Publication Data
US 2020/0238384 A1 Jul. 30, 2020

(30) Foreign Application Priority Data

Sep. 18, 2017 (DE) .................... 10 2017 216 463.8

(51) Int. Cl.
*B22F 12/00* (2021.01)
*B33Y 80/00* (2015.01)
(Continued)

(52) U.S. Cl.
CPC ............. *B22F 12/00* (2021.01); *B33Y 10/00* (2014.12); *F16J 15/40* (2013.01); *B22F 10/10* (2021.01);
(Continued)

(58) Field of Classification Search
CPC ...... B22F 12/00; B22F 10/10; B22F 2998/10; B22F 2999/00; B22F 10/20; B22F 5/106;
(Continued)

(56) References Cited

U.S. PATENT DOCUMENTS 4,257,617 A 3/1981 Hill
5,395,124 A * 3/1995 Brandon ................ F16J 15/441
277/413
(Continued)

FOREIGN PATENT DOCUMENTS

CN 201007355 Y 1/2008
CN 201330850 Y 10/2009
(Continued)

OTHER PUBLICATIONS

PCT International Search Report and Written Opinion of International Searching Authority dated Oct. 12, 2018 corresponding P'CT International Application No. PCT/EP2018/074685 filed Sep. 13, 2018.

*Primary Examiner* — Lawrence Averick

(57) ABSTRACT

A sealing ring for sealing an annular gap between a shaft and a bearing body surrounding the shaft, includes two sealing ring halves having ring segment shapes and a plurality of circumferentially formed sealing tips, arranged axially adjacent on the inner peripheral surface and protruding radially inward. The sealing tips are integrally formed together with the sealing ring halves. A method produces such a sealing ring.

8 Claims, 4 Drawing Sheets

(51) Int. Cl.
- *B33Y 10/00* (2015.01)
- *F16J 15/40* (2006.01)
- *B33Y 30/00* (2015.01)
- *B29C 64/153* (2017.01)
- *B22F 10/10* (2021.01)

(52) U.S. Cl.
CPC ....... *B22F 2998/10* (2013.01); *B22F 2999/00* (2013.01); *B29C 64/153* (2017.08); *B33Y 30/00* (2014.12); *B33Y 80/00* (2014.12); *F05D 2220/31* (2013.01); *F05D 2240/55* (2013.01)

(58) Field of Classification Search
CPC ......... B33Y 10/00; B33Y 30/00; B33Y 80/00; F16J 15/40; F16J 15/442; F16J 15/4472; F16J 15/453; B29C 64/153; F05D 2220/31; F05D 2240/55; F05D 2230/22; F05D 2230/31; F05D 2300/121; Y02P 10/25; F01D 11/04
See application file for complete search history.

(56) References Cited

U.S. PATENT DOCUMENTS

| | | | |
|---|---|---|---|
| 8,840,114 B2* | 9/2014 | Dixon | F01D 25/183 277/412 |
| 9,353,647 B2 | 5/2016 | Bordne et al. | |
| 9,670,935 B2 | 6/2017 | Gerber et al. | |
| 9,746,085 B2* | 8/2017 | Bode | F01D 11/02 |
| 10,208,862 B2* | 2/2019 | Fitzmorris | H02K 5/124 |
| 2012/0228830 A1* | 9/2012 | Bode | F16J 15/453 277/412 |
| 2012/0248707 A1* | 10/2012 | Dixon | F01D 11/04 277/412 |
| 2015/0086343 A1 | 3/2015 | Rizzo et al. | |
| 2016/0201804 A1* | 7/2016 | Fitzmorris | F16J 15/442 277/361 |
| 2017/0045145 A1 | 2/2017 | Williamson et al. | |
| 2018/0135759 A1 | 5/2018 | Hoehle et al. | |
| 2021/0102271 A1* | 4/2021 | Windier | C22B 9/04 |

FOREIGN PATENT DOCUMENTS

| | | | |
|---|---|---|---|
| CN | 203175624 U | 9/2013 | |
| CN | 103375594 A | 10/2013 | |
| CN | 203258075 U | 10/2013 | |
| CN | 204804887 U | 11/2015 | |
| CN | 105593531 A | 5/2016 | |
| CN | 105705843 A | 6/2016 | |
| CN | 105805319 A | 7/2016 | |
| DE | 69328426 T2 | 1/2001 | |
| DE | 3388539 A1 * | 4/2017 | ............... C22B 9/02 |
| EP | 3130827 A1 | 2/2017 | |
| JP | S60214539 A | 10/1985 | |
| JP | H0972427 A | 3/1997 | |
| JP | 2013133900 A | 7/2013 | |
| WO | 2011033065 A1 | 3/2011 | |
| WO | 2013160469 A1 | 10/2013 | |

\* cited by examiner

SEALING RING

CROSS REFERENCE TO RELATED APPLICATIONS

This application is the US National Stage of International Application No. PCT/EP2018/074685 filed 13 Sep. 2018, and claims the benefit thereof. The International Application claims the benefit of German Application No. DE 10 2017 216 463.8 filed 18 Sep. 2017. All of the applications are incorporated by reference herein in their entirety.

FIELD OF INVENTION

The present invention relates to a sealing ring for sealing an annular gap between a shaft and a bearing member which surrounds it, comprising two ring-segment-like sealing ring halves which can be releasably secured to each other and a plurality of sealing tips which are arranged in an axially adjacent manner on the inner peripheral face and which protrude radially inward and which are constructed circumferentially.

BACKGROUND OF INVENTION

Sealing rings of the type mentioned in the introduction are known in the prior art. They are in particular used to seal an annular gap between a shaft and a bearing member which surrounds it and which is arranged or formed in particular on a housing wall which separates a steam chamber and an oil chamber of a steam turbine from each other in order to prevent steam from being able to reach the oil chamber or oil from being able to reach the steam chamber. The sealing ring halves are normally forging blanks of steel, which have partially been subjected to a mechanical processing operation. The sealing tips are provided as separate components which are usually produced from aluminum and which are inserted and caulked in annular grooves formed in the inner peripheral face of the sealing ring. For the use of sealing air, there is formed in at least one sealing ring half by means of drilling a sealing air channel which has a sealing air inlet which is accessible from the outer side for connecting a sealing air device and a sealing air outlet which opens in the region of the sealing tips in the inner peripheral face. Another channel which is produced by means of drilling and which leads from the inner peripheral face to a side face of a sealing ring half forms a pressure measurement channel, to which a pressure measurement device can be connected in order to detect the current pressure of the sealing air and to ensure an optimum pressure adjustment. In order to discharge oil which accumulates between the sealing tips, the sealing ring is further provided with an oil return channel which extends from the inner peripheral face in the direction of a side face of the corresponding sealing ring half and which was also introduced using a drilling method.

A disadvantage of the above-described known sealing ring is that it has a complex and production-intensive construction with many individual components and a high inherent weight. In addition, it is desirable to further improve the functional design of the known sealing ring.

SUMMARY OF INVENTION

Against this background, an object of the present invention is to provide a sealing ring of the type mentioned in the introduction with an alternative structure which at least partially overcomes the disadvantages mentioned above.

In order to achieve this object, the present invention provides a sealing ring of the type mentioned in the introduction, which is characterized in that the sealing tips are constructed in one piece with the sealing ring halves. As a result of such an integral construction, the sealing ring according to the invention has a small number of individual components. Accordingly, the sealing ring according to the invention can be produced and assembled in a simple manner, which involves low costs. Consequently, the present invention relates to a sealing ring for sealing an annular gap between a shaft and a bearing member which surrounds it, comprising two ring-segment-like sealing ring halves and a plurality of sealing tips which are arranged in an axially adjacent manner on the inner peripheral face and which protrude radially inward and which are constructed circumferentially, wherein the sealing tips are constructed in once piece with the sealing ring halves.

Preferably, the sealing ring halves are provided with a sealing air channel system which is produced during the additive production and which has a sealing air inlet channel, at least one sealing air distribution channel which is connected thereto, and a plurality of sealing air outlet channels which are connected to the sealing air distribution channel and which open in the region of the sealing tips in the inner peripheral face. The significant advantage of such a sealing air channel system is that the sealing air can be introduced via the sealing air distribution channel which can be freely configured as a result of the additive production without additional technical production complexity at extremely different peripheral positions in the region of the sealing tips in the inner peripheral face of the sealing ring, whereby the sealing action which is involved with the sealing ring can be optimized as a result of optimized sealing air supply.

According to an embodiment of the present invention, the sealing ring halves and accordingly the sealing tips are produced from aluminum, which first and foremost involves a good sealing action and a very low inherent weight. Furthermore, aluminum is sufficiently soft to prevent rubbing damage in the event of contact with the shafts.

Advantageously, side faces of the sealing ring halves are provided with reinforcement ribs, which enables a comparatively thin-walled construction of the sealing ring halves and consequently a further reduction of the inherent weight and the material costs. The reinforcement ribs may in particular extend in a radial direction. Advantageously, however, reinforcement ribs which extend in a peripheral direction are also provided.

According to an embodiment of the present invention, the sealing ring halves are produced using an additive production method, in particular from a powdered starting material. As an additive production method, selective laser melting (SLM) may be mentioned here by way of example. The use of an additive production method has the advantage that there are only a small number of limitations with regard to the design of the sealing ring. Accordingly, the functionality of the sealing ring according to the invention can also be optimized.

In particular, the sealing air distribution channel is constructed circumferentially and the sealing air outlet channels are arranged in a state distributed in a substantially uniform manner over the periphery of the sealing ring. Accordingly, there is a particularly uniform action of sealing air on the intermediate spaces present between the sealing tips and the shaft.

Preferably, at least one sealing ring half is provided with a pressure measurement channel which is produced during the additive production and which is connected to the sealing air channel system and which is provided to connect the sealing air system to a pressure measurement device, wherein the pressure measurement channel opens in particular in the sealing air distribution channel, whereby a particularly simple construction is achieved. Using the pressure measurement device, the sealing air supply can be checked, adjusted and/or also controlled.

According to an embodiment of the present invention, at least one sealing ring half is provided with at least one oil return channel which is produced during the additive production and which extends from the inner peripheral face in the direction of a side face of the sealing ring half. Via such an oil return channel, oil which has accumulated between the sealing tips can be discharged.

Preferably, a plurality of oil return channels are provided, wherein at least one oil return channel terminates shortly before the side face of the sealing ring half. The oil return channel which terminates shortly before the side face can then be selectively drilled if a larger oil return capacity should be required. In this manner, the sealing ring according to the invention can be adapted in a flexible manner to different requirements on the oil return capacity. In particular, there is provided on the side face a drill attachment which marks a position for positioning a drilling tool in order starting from the side face to drill an access to the oil return channel which is still closed. Such a drill attachment facilitates the drilling processing operation.

Furthermore, in order to solve the problem set out in the introduction, the present invention provides a method for producing a sealing ring according to the invention, comprising the steps of: producing the sealing ring halves using an additive production method, in particular with the sealing air channel system being formed and/or the pressure measurement channel and/or one of or the oil return channels; milling the parting joints of the sealing ring halves; assembling the sealing ring by clamping the sealing ring halves and mechanically processing the outer peripheral face and the inner peripheral face of the sealing ring with the sealing tips being formed, in particular using a turning and/or grinding method.

According to an embodiment of the method according to the invention, an access to an oil return channel which is produced in the context of the additive production and/or to a pressure measurement channel which is produced in the context of the additive production is further drilled.

BRIEF DESCRIPTION OF THE DRAWINGS

Other features and advantages of the present invention will be appreciated with reference to the following description of embodiments of arrangements according to the invention and the drawings, in which.

DETAILED DESCRIPTION OF INVENTION

FIGS. 1 to 7 show different views of a sealing ring 1 according to an embodiment of the present invention which is used to seal an annular gap between a shaft and a bearing member which surrounds it and which is constructed on or integrally with a housing wall and which in particular separates a steam chamber and an oil chamber of a steam turbine from each other. In this instance, the bearing members and the housing wall are in each case advantageously subdivided into an upper and a lower portion.

Figure 1:
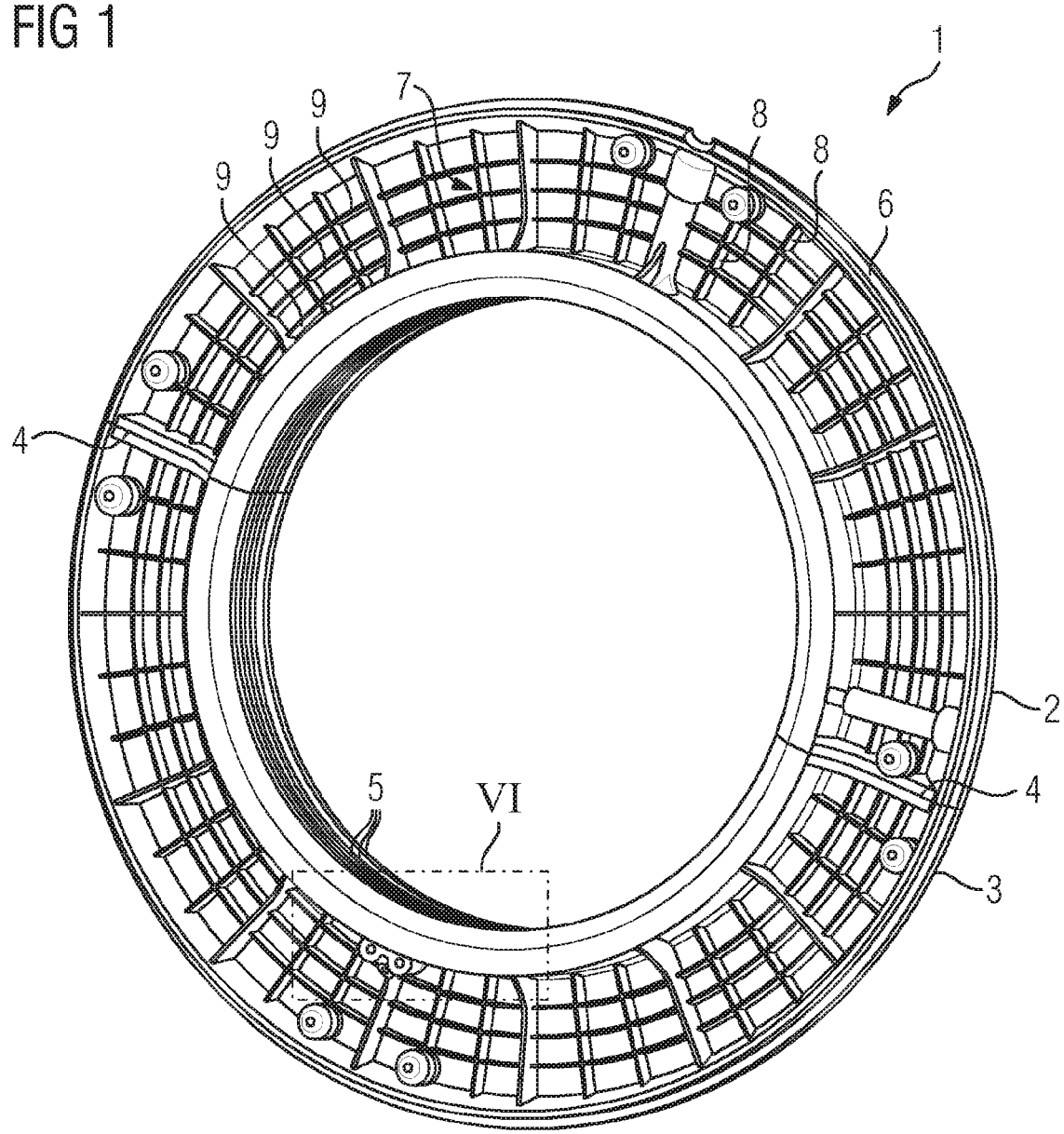
FIG. 1 is a perspective view of a sealing ring according to an embodiment of the present invention.
Figure 2:
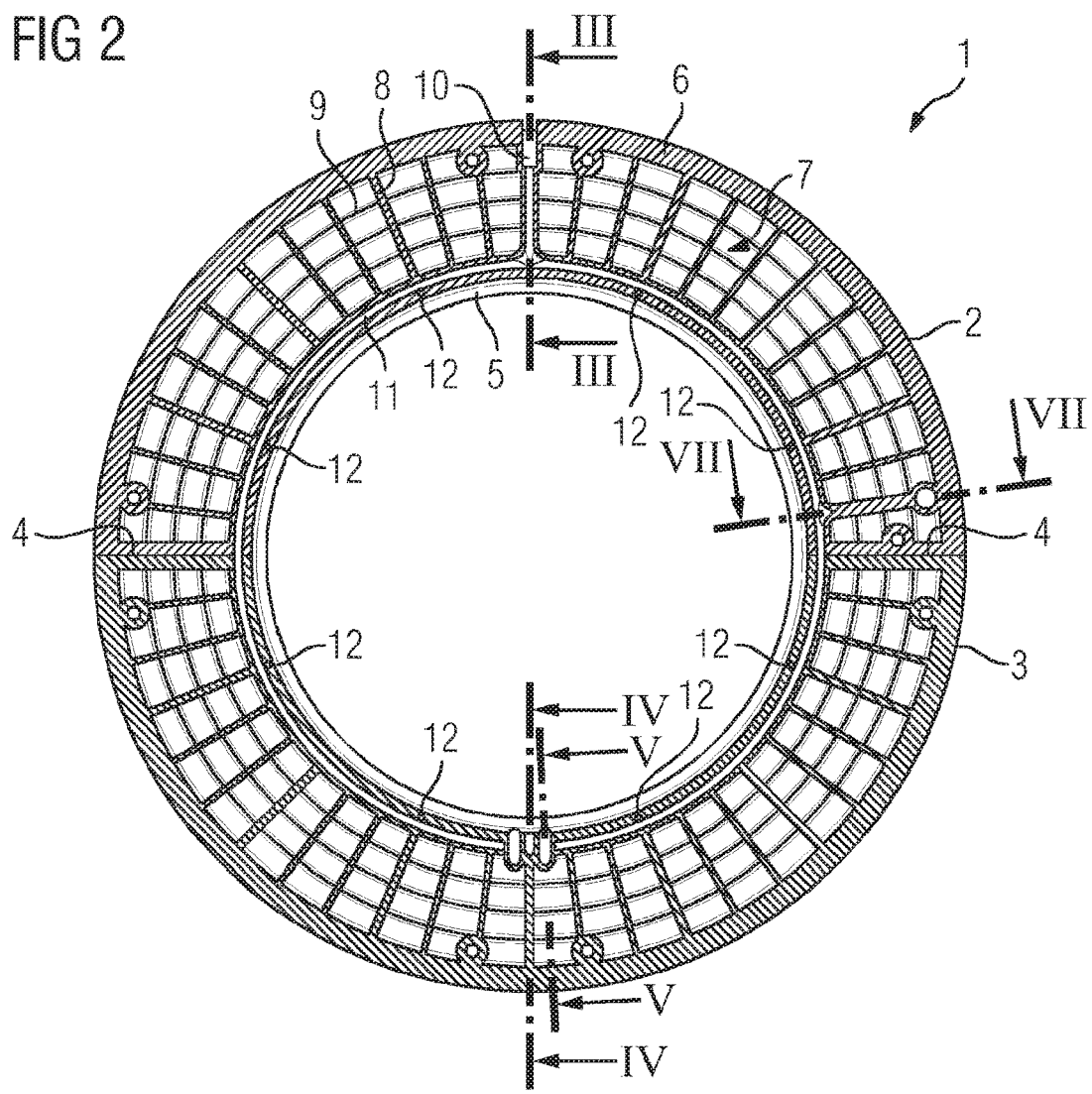
FIG. 2 is a sectioned view through the sealing ring illustrated in FIG. 1.
Figure 3:
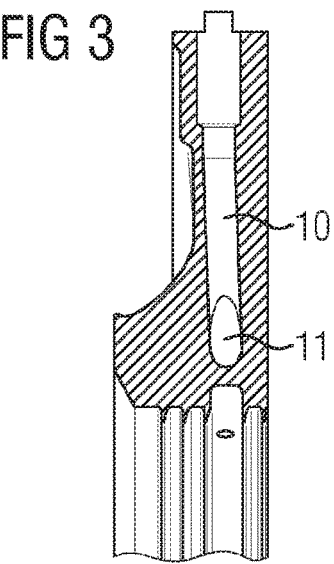
FIG. 3 is a sectioned view along the line III-III in FIG. 2.
Figure 4:
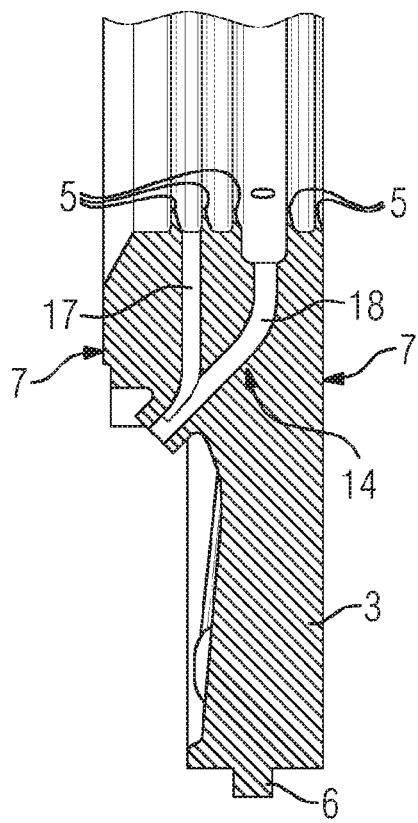
FIG. 4 is a sectioned view along the line IV-IV in FIG. 2.
Figure 5:
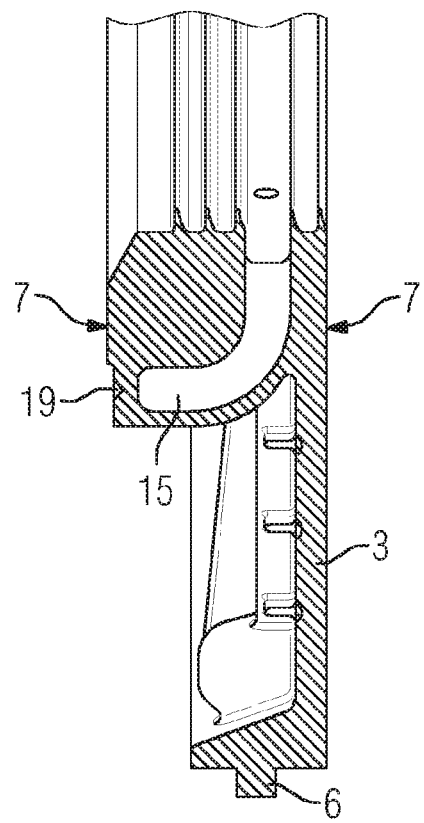
FIG. 5 is a sectioned view along the line V-V in FIG. 2.
Figure 6:
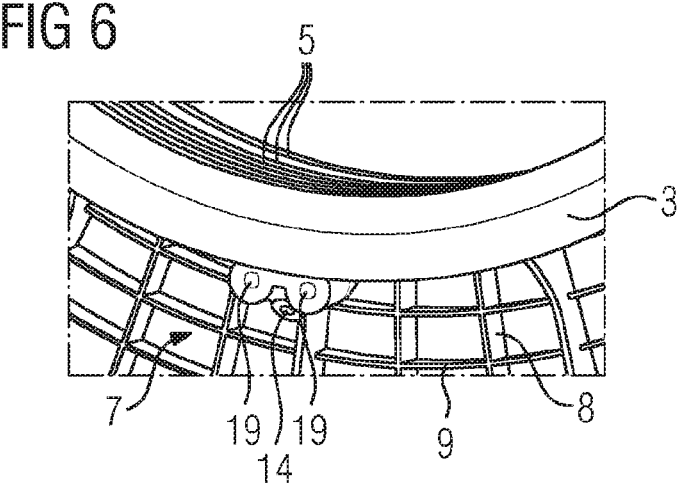
FIG. 6 is an enlarged view of the cut-out designated VI in FIG. 1.
Figure 7:
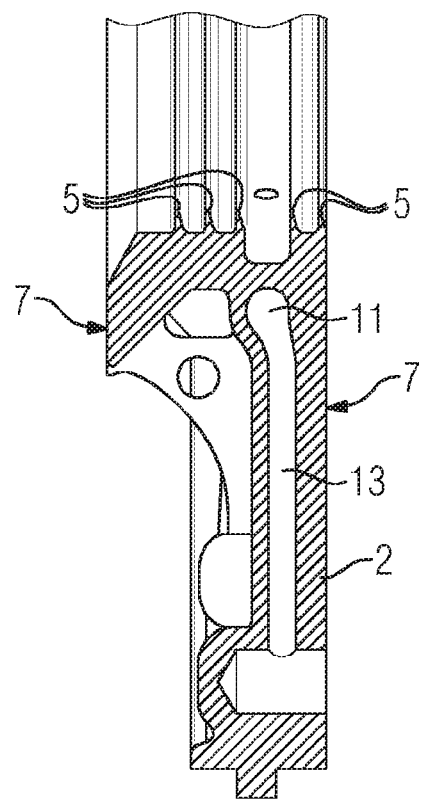
FIG. 7 is a sectioned view along the line VII-VII in FIG. 2.

The sealing ring 1 comprises two ring-segment-like sealing rings halves 2 and 3, whose mutually facing parting joints 4 are positioned adjoining each other and can be releasably placed on each other in this state, as shown in FIGS. 1 and 2. The releasable securing may, for example, be carried out using securing screws which are not illustrated in greater detail in this instance and which clamp the parting joints 4 of the sealing ring halves 2 and 3 with respect to each other. Additionally or alternatively, however, the sealing ring halves 2 and 3 may also be orientated with respect to each other by way of centering means provided in the region of the parting joints 4. An orientation of the sealing ring halves is also possible by the halves being fixed during assembly by means of fitting in the bearing member lower and upper portion. On the inner peripheral face of the sealing ring 1, there are provided a plurality of sealing tips 5 which are arranged in an axially adjacent manner, which protrude inward and which are constructed circumferentially and which are constructed integrally with the sealing ring halves 2 and 3. Along the outer peripheral face of the sealing ring 1 there extends a projection 6 which is constructed in a substantially circumferential manner and which protrudes radially outward and which serves to be received in a correspondingly constructed peripheral groove of the bearing member(s). The mutually opposing side faces 7 of the sealing ring halves 2 and 3 or the sealing ring 1 are provided with a large number of reinforcement ribs 8 and 9, wherein the reinforcement ribs 8 extend in a radial direction and the reinforcement ribs extend in a peripheral direction. Furthermore, axial approach surfaces which extend adjacent to the inner periphery are formed on the side faces 7. A sealing air channel system extends within the sealing ring halves 2 and 3 with reference to FIGS. 2 and 3. The sealing air channel system comprises a sealing air inlet channel 10, a sealing air distribution channel 11 and a plurality of sealing air outlet channels 12. The sealing air inlet channel 10 which is configured to connect a sealing air device thereto, extends from the outer periphery of the sealing ring half 2 radially inward and opens in the sealing air distribution channel 11 which in this instance is constructed to extend almost completely in the peripheral direction. The sealing air outlet channels 12 extend in each case from the sealing air distribution channel radially inward and open in the region of the sealing tips 5 in the inner peripheral face of the sealing ring, wherein the sealing air outlet channels are in this instance arranged so as to be distributed in a uniform manner over the periphery of the sealing ring 1. Furthermore, there is provided a pressure measurement channel 13 which is configured to connect a pressure measurement device thereto. The pressure measurement channel 13 is in this instance constructed in the sealing ring half 2 and extends from the outer peripheral face radially inward as far as the sealing air distribution channel 11, see FIG. 7. The lower sealing half 3 comprises with reference to FIGS. 4 and 5 a total of three return channels 14, 15 and 16. The oil return channel 14 extends from one of the side faces 7 of the sealing ring half 3 substantially radially inward in the direction of the inner peripheral face and branches into two part-channels 17 and 18 which open in a manner axially spaced apart from each other in the region of the sealing tips 5 in the inner peripheral face of the sealing ring 1. The return channels 15, 16 which are each arranged in the peripheral direction adjacent to the oil return channel 14 and in this instance have a larger diameter than it, also open in the region of the sealing tips 5 in the inner peripheral face of the sealing ring 1. However, they terminate at the other end shortly before the side face 7 in which the oil return channel 14 also opens, wherein there is provided in each case on the side face 7 a drill attachment 19 which marks a position for placing a drill tool in order starting from the side face 7 to optionally drill an access to the respective return channels 15 and/or 16.

Figure 8:
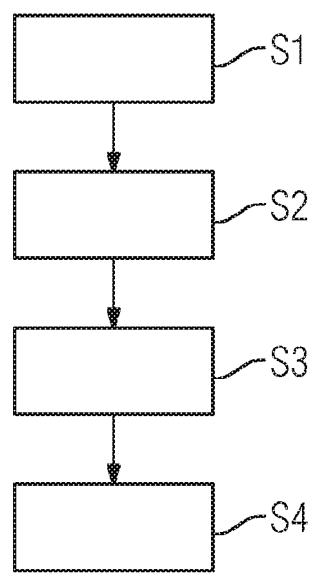
FIG. 8 is a flow chart of a method according to the invention for producing the sealing ring illustrated in FIGS. 1 to 7.

In order to produce the sealing ring 1, in a method according to an embodiment of the present invention, with reference to FIG. 8, in a first step 51 the sealing ring halves 2 and 3 including the sealing air channel system, the pressure measurement channel 13 and the oil return channels 14, 15 and 16 using an additive production method are constructed in layers, in particular starting from a powdered material. For example, selective laser melting (SLM) can be used as an additive production method.

In another step S2, the parting joints 4 of the respective sealing ring halves 2 and 3 are subjected to a milling processing operation so that they can be arranged adjoining each other in a planar manner.

In another step S3, the sealing ring 1 is assembled by clamping the sealing ring halves 2 and 3. For clamping, it is possible to use in particular securing screws which are not illustrated in greater detail and which press the mutually opposing parting joints 4 of the sealing ring halves 2 and 3 against each other.

In a subsequent step S4, on the one hand, the outer peripheral face of the sealing ring 1 is mechanically processed in the context of a turning and/or grinding processing operation in order to provide the projection 6 with the desired dimensions. Furthermore, in the step S4, the inner peripheral face of the sealing ring 1 is mechanically processed, in particular using a turning and/or grinding method in order to form the sealing tips 5.

Furthermore, if it should be required, the starting regions of the sealing air inlet channel 10 and the pressure measurement channel 13 can be mechanically processed in order to be able to correctly connect a sealing air device or a pressure measurement device.

Prior to the assembly of the sealing ring, in order to increase the oil return capacity, the oil return channels 15, 16 can optionally be drilled by a drill being placed on the corresponding drill attachment 19 and an access being drilled.

A significant advantage of the sealing ring 1 according to the invention involves it being able to be produced in a simple, economical and rapid manner since the sealing air channel system, the pressure measurement channel and the oil return channels can already be produced during the additive production of the sealing ring halves 2 and 3, wherein the respective design of the channels in contrast to a drilling processing operation can be selected very freely. The latter leads, for example, to the sealing air, when the sealing air channel system is constructed accordingly, being able to be supplied in a state distributed in a uniform manner over the inner peripheral face of the sealing ring 1, which involves an improved sealing performance. As a result of the construction of the sealing tips 5 in the context of a mechanical processing operation of the sealing ring halves 2, it is possible to dispense with components, whereby costs are also saved during production and assembly. In addition, as a result of the construction of the oil return channels 14, 15 and 16, the oil return capacity is variable. This is particularly significant when the sealing ring 1 has to provide the sealing action thereof in some cases with sealing air and in some cases without sealing air.

Although the invention has been illustrated and described in greater detail by the preferred embodiment, the invention is not limited by the examples disclosed and other variations can be derived therefrom by the person skilled in the art without departing from the protective scope of the invention.

The invention claimed is:

1. A sealing ring for sealing an annular gap between a shaft and a bearing member which surrounds it, comprising:
   two ring-segment-like sealing ring halves, and
   a plurality of sealing tips which are arranged in an axially adjacent manner on an inner peripheral face and which protrude radially inward and which are constructed circumferentially,
   wherein the plurality of sealing tips are integrally constructed in one piece with the sealing ring halves,
   wherein the sealing ring halves are produced using an additive production method, and wherein the sealing ring halves are provided with a sealing air channel system which is produced during the additive production and which has a sealing air inlet channel,
   at least one sealing air distribution channel extending circumferentially in the sealing ring halves, the at least one sealing air distribution channel fluidly connected to the sealing air inlet channel to receive sealing air, and
   a plurality of sealing air outlet channels each fluidly connected to the sealing air distribution channel,
   wherein each of the sealing air outlet channels extends radially from the at least one sealing air distribution channel, and
   wherein each of the sealing air outlet channels is fluidly connected to supply sealing air from the at least one sealing air distribution channel to a respective circumferential location where a respective sealing tip of the plurality of sealing tips is located in the inner peripheral face of the sealing ring halves.

2. The sealing ring as claimed in claim 1, wherein the sealing ring halves are produced from aluminum.

3. The sealing ring as claimed in claim 1,
   wherein side faces of the sealing ring halves are provided with reinforcement ribs.

4. The sealing ring as claimed in claim 1,
   wherein the sealing ring halves are produced using an additive production method from a powdered starting material.

5. The sealing ring as claimed in claim 1,
   wherein the sealing air distribution channel is constructed in a circumferential or substantially circumferential manner and the sealing air outlet channels are arranged in a state distributed in a substantially uniform manner over the periphery of the sealing ring.

6. The sealing ring as claimed in claim 1,
   wherein at least one sealing ring half is provided with a pressure measurement channel which is produced during the additive production and which is connected to the sealing air channel system and which is provided to connect the sealing air system to a pressure measurement device, wherein the pressure measurement channel opens in the sealing air distribution channel.

7. The sealing ring as claimed in claim 1,
wherein at least one sealing ring half is provided with at least one oil return channel which is produced during the additive production and which extends from the inner peripheral face in the direction of a side face of the sealing ring half.

8. The sealing ring as claimed in claim 7,
wherein a plurality of oil return channels are provided and in that at least one oil return channel terminates shortly before the side face of the sealing ring half, wherein there is provided on the side face in particular a drill attachment which marks a position for placing a drilling tool in order starting from the side face to drill an access to the oil return channel.

* * * * *